(12) United States Patent
Liang

(10) Patent No.: US 7,798,776 B1
(45) Date of Patent: Sep. 21, 2010

(54) TURBINE BLADE WITH SHOWERHEAD FILM COOLING

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 716 days.

(21) Appl. No.: 11/821,135

(22) Filed: Jun. 21, 2007

(51) Int. Cl.
F01D 5/08 (2006.01)
F01D 5/18 (2006.01)

(52) U.S. Cl. .................... 416/97 R; 415/115; 415/116; 415/176; 415/178

(58) Field of Classification Search ................ 415/115, 415/116, 176, 178; 416/96 R, 96 A, 97 R, 416/97 A
See application file for complete search history.

(56) References Cited

U.S. PATENT DOCUMENTS 4,664,597 A * 5/1987 Auxier et al. ............. 416/97 R
5,374,162 A * 12/1994 Green ....................... 416/97 R
6,176,676 B1 * 1/2001 Ikeda et al. ................. 415/115
7,021,896 B2 * 4/2006 Dodd ........................ 416/97 R
2006/0171807 A1 * 8/2006 Lee ........................... 416/97 R

* cited by examiner

Primary Examiner—Igor Kershteyn
(74) Attorney, Agent, or Firm—John Ryznic

(57) ABSTRACT

A showerhead film cooling hole arrangement for a turbine blade used in a gas turbine engine. The showerhead includes at least three rows of film cooling holes with the middle row arranged along the stagnation point. A second row of film cooling holes is arranged on the pressure side of the first row, and a third row of film cooling holes is arranged on the suction side of the first row. Each of the three rows includes a diffusion opening in which the diffusion is expanding in the outward direction or the inward direction with an angle from greater than zero degrees to around 5 degrees.

10 Claims, 4 Drawing Sheets

View A-A

View B-B

TURBINE BLADE WITH SHOWERHEAD FILM COOLING

BACKGROUND OF THE INVENTION

1. Field of the Invention

The present invention relates generally to air cooled turbine blades, and more specifically to cooling the leading edge region of the turbine blade.

2. Description of the Related Art Including Information Disclosed Under 37 CFR 1.97 and 1.98

A gas turbine engine, such as an aero engine used in an aircraft or an industrial gas turbine engine used in a ground based power plant, includes a turbine section with multiple rows of rotor blades and stationary vanes or guide a high temperature gas through the turbine to react with the turbine blades and drive the rotor shaft. Since the efficiency of the engine can be increased by passing a higher temperature gas into the turbine, some of the rows of blades and vanes require internal cooling air that provides convection cooling, impingement cooling and film cooling for the internal surfaces and the exterior surface of these airfoils.

The leading edge region of the airfoil is exposed to the hot gas flow in a direct head-on manner. In the prior art as shown in FIGS. 1 and 2 which shows a cut-away view of the blade, the blade leading edge is cooled by impingement cooling from the backside and film cooling through film cooling holes. The prior art showerhead film cooling includes three rows in which a middle row 11 is positioned at the airfoil stagnation point where the highest heat loads occur on the airfoil leading edge. A pressure side row 12 and a suction side row 13 form the three rows in the showerhead arrangement. The film cooling holes 11 through 13 have the same constant diameter from the inlet to the outlet of the hole. Film cooling holes for each row are arranged in an inline pattern and incline at from 20 degrees to 35 degrees relative to the blade leading edge radial surface as seen in FIGS. 3 and 4.

The disadvantage of the showerhead arrangement of the prior art FIGS. 1 through 4 design is the over-lapping of film ejection flow in a rotational environment. As a result of this type of film hole arrangement, a hot streak is shown in-between film holes as displayed in FIG. 4. Hot spots can lead to erosion of the metal substrate and therefore significantly decrease the life of the blade.

U.S. Pat. No. 6,869,268 B2 issued to Liang on Mar. 22, 2005 and entitled COMBUSTION TURBINE WITH AIRFOIL HAVING ENHANCED LEADING EDGE DIFFUSION HOLES AND RELATED METHODS disclosed a showerhead with film cooling holes having a constant diameter inlet and a diffusion outlet in which the outlet has an expansion on the inward wall, the expansion being "in a range of about 5 degrees to about 20 degrees" and the constant diameter hole being angled upward at from about 20 degrees to about 35 degrees.

It is therefore an object of the present invention to provide for a turbine blade leading edge showerhead cooling arrangement that will provide for a high leading edge film effectiveness for a high temperature blade.

BRIEF SUMMARY OF THE INVENTION

A showerhead film cooling hole arrangement for a turbine blade used in a gas turbine engine. The showerhead includes at least three rows of film cooling holes with the middle row arranged along the stagnation point. A second row of film cooling holes is arranged on the pressure side of the first row, and a third row of film cooling holes is arranged on the suction side of the first row. Each of the three rows includes a diffusion opening in which the diffusion is expanding in the outward direction or the inward direction with an angle from greater than zero degrees to around 5 degrees. Each of the three film cooling rows is inclined toward the blade tip in the upward direction from about 20 degrees to about 30 degrees. The present invention provides for the stagnation row to have either an outward or inward expansion while the other two rows have the opposite expansion. This arrangement provides for a more effective film coverage to provide improved cooling for the leading edge region of the blade, especially for a rotating airfoil such as a blade.

In a second embodiment, the wall opposite to the larger expansion includes an expansion in the range of about 1 degree to about 3 degrees. The side walls for each of the three rows has no expansion.

DETAILED DESCRIPTION OF THE INVENTION

The present invention is a showerhead arrangement of at least three rows of film cooling holes for use in a rotor blade of a gas turbine engine. The arrangement of film cooling holes are useful in providing a more effective film of cooling air over a leading edge surface for a rotating blade. However, the present invention could be used in the leading edge region for a stationary stator vane or guide vane of the turbine.

Figure 1:
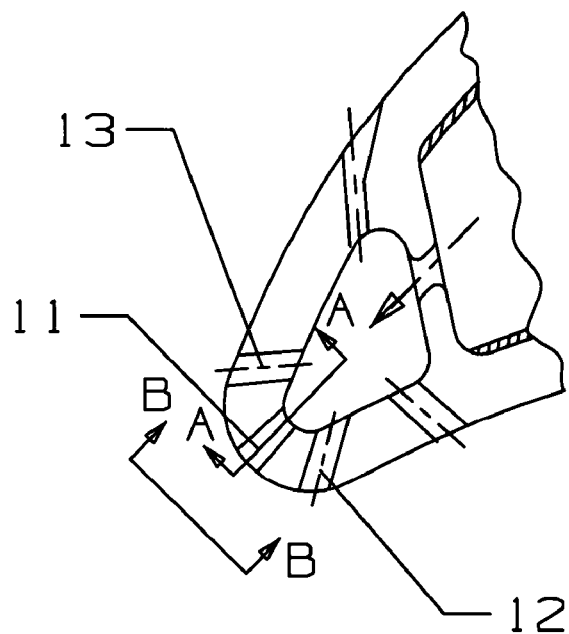
FIG. 1 shows a cross section view of a leading edge region cooling circuit for a prior art turbine blade.
Figure 2:
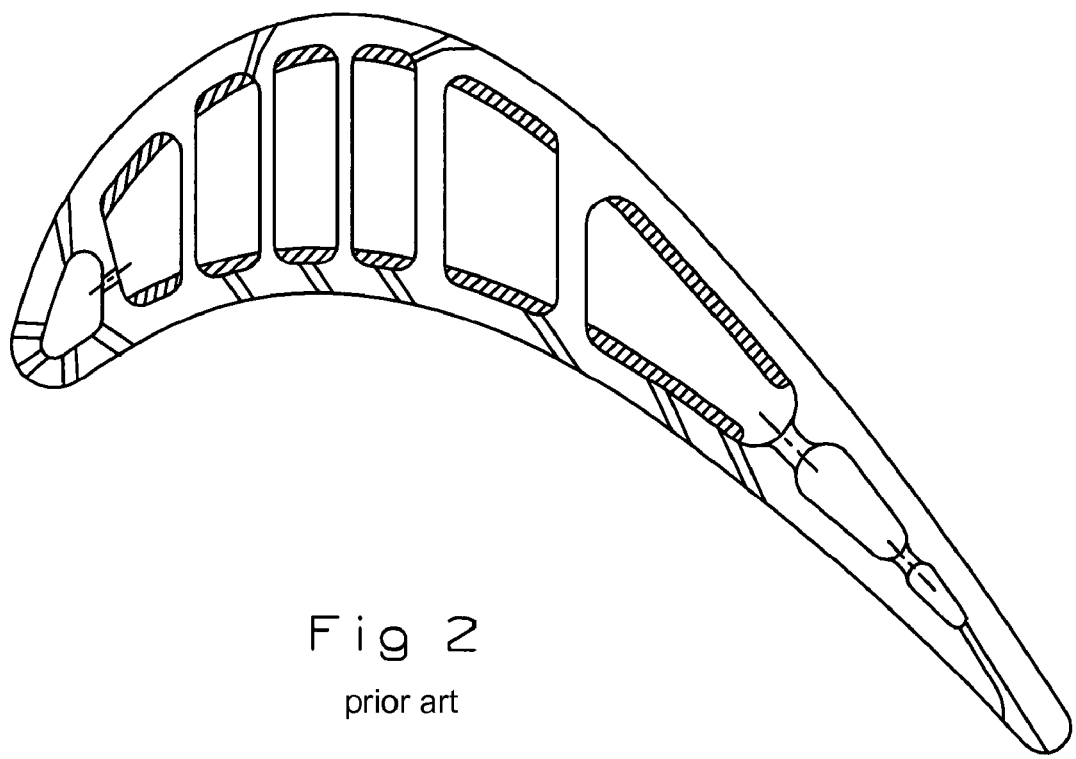
FIG. 2 shows a cross section view of a prior art turbine blade with the cooling circuit for the entire blade.
Figures 3, 4:
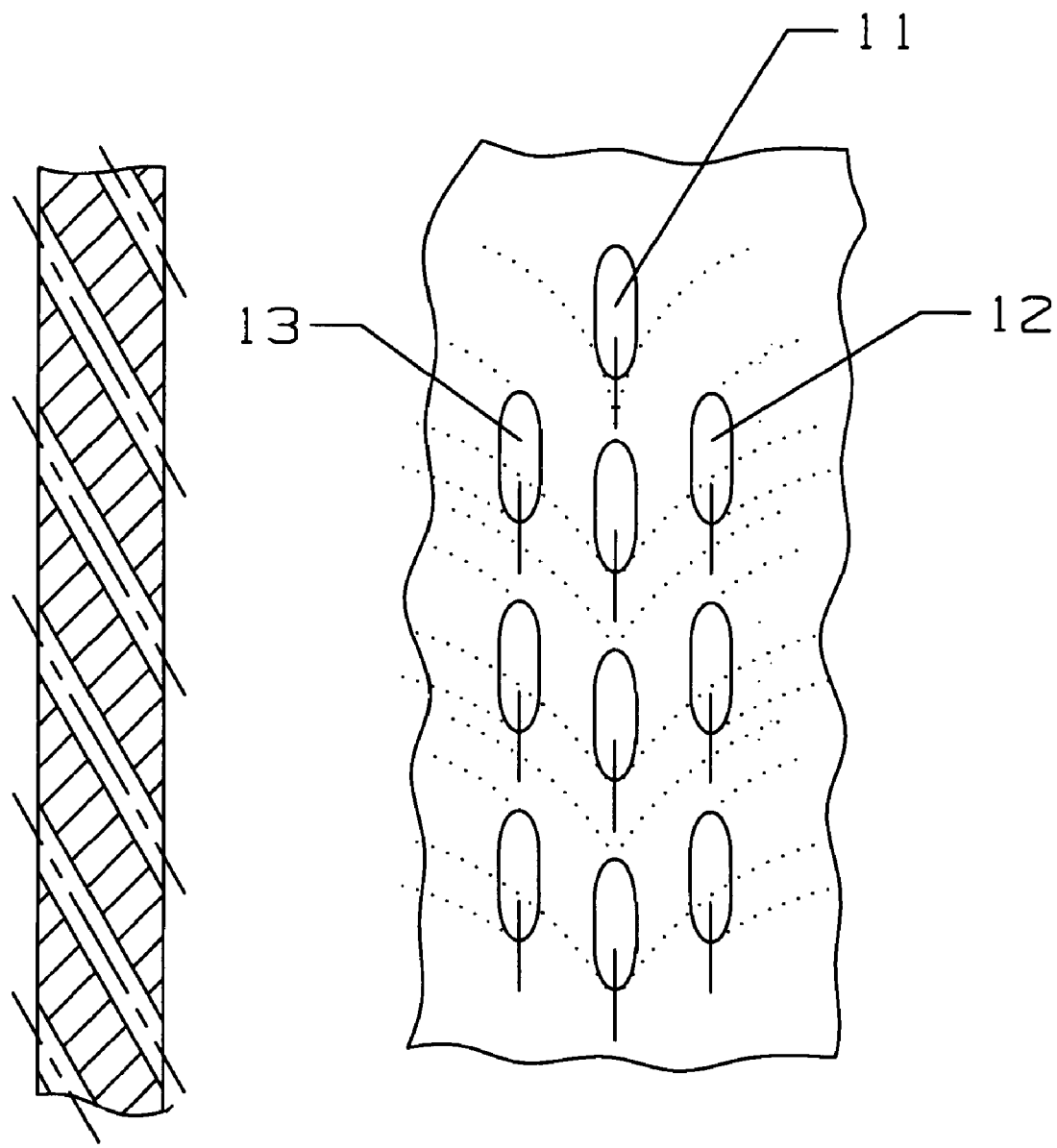
FIG. 3 shows a cross section view of the row of film cooling holes along the stagnation point in the FIG. 1 prior art turbine blade.
FIG. 4 shows a front view of the film cooling holes along the leading edge region of the blade in FIGS. 1 and 2.
Figures 5, 6, 7:
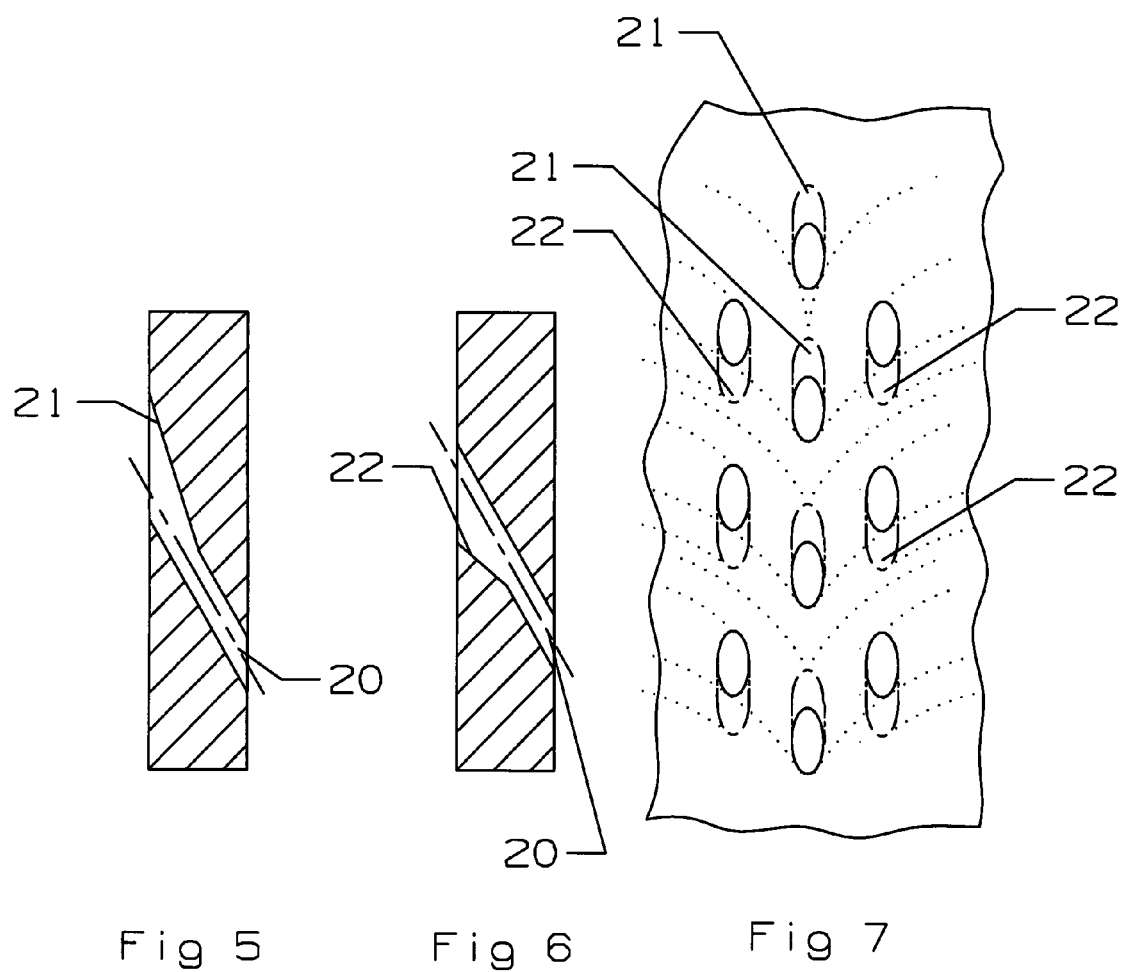
FIG. 5 shows a film cooling hole with an outward expansion for the showerhead of the present invention.
FIG. 6 shows a film cooling hole with an inward expansion for the showerhead of the present invention.
FIG. 7 shows the showerhead arrangement of film cooling holes for the present invention.

FIG. 7 shows the leading edge region of the turbine blade with the three rows of film cooling holes used in the present invention. The middle row is positioned along the stagnation point of the leading edge. One row is located on the pressure side of the leading edge and another row is located on the suction side from the stagnation row. In FIG. 7, the solid lines around the holes represent the constant diameter portion of the hole while the dashed lines (above the solid lines in the middle row and below the solid lines in the adjacent rows) represents the expansion of the hole in the diffusion section downstream from the constant diameter section of the film cooling hole.

FIG. 5 shows a film cooling hole having an upward inclination of from around 20 degrees to around 30 degrees with an outward expansion on the opening of greater than zero degrees to around 5 degrees to provide for outward diffusion of the cooling air. FIG. 6 shows a film cooling hole having an outward inclination of from around 20 degrees to around 30 degrees with an inward expansion on the opening of greater than zero degrees to around 5 degrees to provide for outward diffusion of the cooling air.

No expansion is produced along the side walls and the inward wall in the FIG. 5 film cooling hole, and no expansion is produced along the side walls and the outward wall in the FIG. 6 film cooling hole.

To provide for an improved film cooling effectiveness and distribution for film coverage of the present invention, the stagnation row of film cooling holes includes either an outward expansion as shown in FIG. 5 or the inward expansion as shown in FIG. 6. The two adjacent rows on the pressure and the suction sides from the stagnation row will both have the opposite expansion than does the stagnation row. For example, if the stagnation row has an outward expansion of FIG. 5, then the pressure side row and the suction side row will both have inward expansion of FIG. 6. If the stagnation row has an inward expansion of FIG. 6, then the pressure side row and the suction side row will both have outward expansion of FIG. 5.

Either of these two embodiments, the cooling flow ejection for the stagnation film row is no longer inline with the film rows for the blade leading edge pressure and suction side rows. Also, the use of the 2-dimension diffusion holes in the showerhead film hole arrangement of the present invention expands the film hole breakout in the opposite direction and therefore increases the film coverage as well as eliminates the film over-lapping problem of the cited prior art and yields a uniform film layer for the blade leading edge region. In addition, the 2-dimensional diffusion shaped showerhead hole reduces the cooling exit velocity which lowers the film blowing parameter ration in the showerhead region and results in an improved film effectiveness over the cited prior art designs for the leading edge showerhead.

Figure 8:
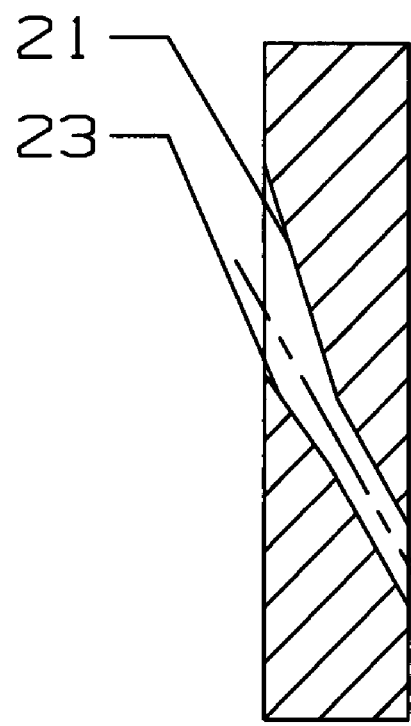
FIG. 8 shows a second embodiment of the present invention in which the outward expansion hole also includes a slight inward expansion.
Figure 9:
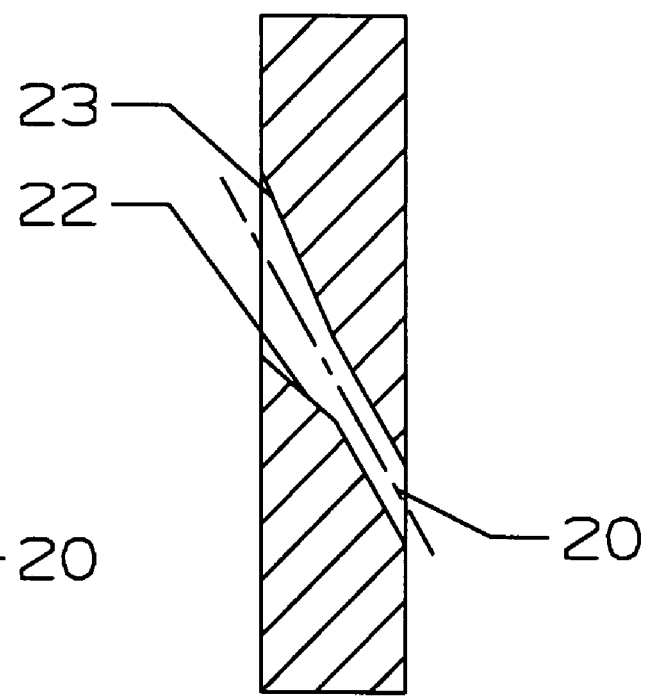
FIG. 9 shows a second embodiment of the present invention in which the inward expansion hole also includes a slight outward expansion.

FIGS. 8 and 9 show a second embodiment of the present invention in which the 2 film cooling holes of FIGS. 5 and 6 have a slight expansion along the wall opposite to the inward or outward expansion that is used in FIGS. 5 and 6. The FIG. 8 film cooling hole is similar to the FIG. 5 film cooling hole but includes a slight expansion on the inward wall of from about 1 degree to about 3 degrees. The FIG. 9 film cooling hole is similar to the FIG. 6 film cooling hole but includes a slight expansion on the outward wall of from about 1 degree to about 3 degrees. In the showerhead arrangement of the present invention using the FIG. 8 and FIG. 9 film cooling holes, the stagnation row would use the FIG. 8 or the FIG. 9 film cooling hole while the adjacent film cooling holes (the pressure side and the suction side holes) would use the other of the FIG. 8 and FIG. 9 hole.

The diffusion holes also achieve an improved convection surface area that is especially useful at the external half of the airfoil wall. This results in more convective cooling on the external half of the airfoil wall than on the inner half of the airfoil wall and reduces the airfoil leading edge through wall thermal gradient to achieve a more balanced thermal design.

Thus, the showerhead of the present invention increases the blade leading edge film effectiveness to a level above the cited prior art showerhead arrangements and improves the overall convection capability that reduces the blade leading edge metal temperature.

I claim the following:

1. A cooled and hollow turbine blade comprising:
a showerhead to provide film cooling for the leading edge of the blade;
the showerhead comprising at least three rows of film cooling holes, with a first row near the stagnation point, the second row adjacent to the first row and on the pressure side, and the third row adjacent to the first row and on the suction side;
the three rows of film cooling holes being angled upward in a range from about 20 degree to about 35 degrees relative to the blade surface;
the first row having a constant diameter inlet section and an outlet section with an inward or an outward expansion; and,
the second row and the third row having a constant diameter inlet section and an outlet section with an outward or an inward expansion such that the expansion of the first row is opposite to the expansion of the second and third rows.

2. The turbine blade of claim 1, and further comprising:
the outward expansion and the inward expansion are in a range of greater than zero degrees to about 5 degrees.

3. The turbine blade of claim 1, and further comprising:
each film cooling holes having two side walls, and the two side walls of each hole in the first and second and third rows have no expansion.

4. The turbine blade of claim 2, and further comprising:
in each of the three rows, a wall opposite to the zero to 5 degree expansion includes an expansion in the range of about 1 degree to about 3 degrees.

5. The turbine blade of claim 4, and further comprising:
each film cooling holes having two side walls, and the two side walls of each hole in the first and second and third rows have no expansion.

6. A cooled and hollow turbine blade comprising:
a leading edge with a showerhead arrangement of film cooling holes;
the showerhead arrangement of film cooling holes including a first row along a stagnation line and a second row along a pressure side of the stagnation line and a third row along a suction side of the stagnation line;
the three rows of film cooling holes each having an inlet metering section and a diffusion section;
the first row of film cooling holes having an expansion on one of an upper wall or a bottom wall of the diffusion section;
the second and third rows of film cooling holes having an expansion on the other of the upper wall or a bottom wall of the diffusion section; and,
the second and third rows of film cooling holes having a side wall of the diffusion section closest to the stagnation line with zero expansion.

7. The turbine blade of claim 6, and further comprising:
the upper wall or bottom wall diffusion is in the range of greater than zero degrees to about 5 degrees.

8. The turbine blade of claim 6, and further comprising:
the first row of film cooling holes has two side walls of the diffusion section with zero expansion.

9. The turbine blade of claim 6, and further comprising:
the three rows of film cooling holes in the showerhead have a wall opposite from the expansion wall with an expansion in the range of from about 1 degree to about 3 degrees.

10. The turbine blade of claim 6, and further comprising:
the three rows of film cooling holes in the showerhead have an axis offset in the range of about 20 decrees to about 25 degrees from the blade surface.

* * * * *